(12) United States Patent
Oh et al.

(10) Patent No.: US 11,340,722 B2
(45) Date of Patent: May 24, 2022

(54) TOUCH SENSOR-ANTENNA MODULE AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Yun Seok Oh, Gyeonggi-do (KR); Jong Min Kim, Gyeonggi-do (KR); Han Sub Ryu, Gyeongsangbuk-do (KR); Won Bin Hong, Seoul (KR)

(73) Assignees: DONGWOO FINE-CHEM CO., LTD., Jeollabuk-Do (KR); POSTECH RESEARCH AND BUSINESS DEVELOPMENT FOUNDATION, Gyeongsangbuk-Do (KR)

( * ) Notice: Subject to any disclaimer, the term of this patent is extended or adjusted under 35 U.S.C. 154(b) by 0 days.

(21) Appl. No.: 16/811,179

(22) Filed: Mar. 6, 2020

(65) Prior Publication Data
US 2020/0201470 A1 Jun. 25, 2020

Related U.S. Application Data

(63) Continuation of application No. PCT/KR2019/012249, filed on Sep. 20, 2019.

(30) Foreign Application Priority Data

Oct. 4, 2018 (KR) .......................... 10-2018-0118469

(51) Int. Cl.
*G06F 3/041* (2006.01)
*G06F 3/047* (2006.01)
(Continued)

(52) U.S. Cl.
CPC ............ *G06F 3/0412* (2013.01); *G06F 3/047* (2013.01); *G06F 3/0443* (2019.05);
(Continued)

(58) Field of Classification Search
None
See application file for complete search history.

(56) References Cited

U.S. PATENT DOCUMENTS

2011/0298670 A1* 12/2011 Jung ...................... H01Q 1/243
343/702
2015/0255856 A1* 9/2015 Hong ................... H01Q 21/061
343/702
(Continued)

FOREIGN PATENT DOCUMENTS

JP 2003-332830 A 11/2003
KR 2003-0013739 A 2/2003
(Continued)

*Primary Examiner* — Parul H Gupta
(74) *Attorney, Agent, or Firm* — The PL Law Group, PLLC

(57) ABSTRACT

A touch sensor-antenna module includes a touch sensor electrode layer including a plurality of sensing electrodes and traces electrically connected to the sensing electrodes, and an antenna electrode layer disposed over the touch sensor electrode layer or under the touch sensor electrode layer. The antenna electrode layer includes an antenna pattern that does not overlap the traces in a planar view. An electrical interference from the traces may be reduced to improve an antenna signal property.

14 Claims, 7 Drawing Sheets

(51) Int. Cl.
*H01Q 1/24* (2006.01)
*G06F 3/044* (2006.01)

(52) U.S. Cl.
CPC ........... *G06F 3/0446* (2019.05); *H01Q 1/243* (2013.01); *G06F 2203/04103* (2013.01)

(56) References Cited

U.S. PATENT DOCUMENTS

| | | | |
|---|---|---|---|
| 2017/0083153 A1* | 3/2017 | Yeh | G06F 3/0412 |
| 2017/0139520 A1* | 5/2017 | Yeh | H01Q 9/30 |
| 2018/0074843 A1* | 3/2018 | Smith | G06F 9/45558 |
| 2019/0036208 A1* | 1/2019 | Yamagishi | G06K 7/10297 |

FOREIGN PATENT DOCUMENTS

| | | |
|---|---|---|
| KR | 2003-0095557 A | 12/2003 |
| KR | 10-2013-0070247 A | 6/2013 |
| KR | 10-2014-0092366 A | 7/2014 |
| KR | 10-2014-0100822 A | 8/2014 |
| KR | 10-2015-0104509 A | 9/2015 |
| KR | 10-2016-0086697 A | 7/2016 |

* cited by examiner

TOUCH SENSOR-ANTENNA MODULE AND DISPLAY DEVICE INCLUDING THE SAME

CROSS REFERENCE TO RELATED APPLICATIONS AND CLAIM OF PRIORITY

The present application is a continuation application to International Application No. PCT/KR2019/012249 with an International Filing Date of Sep. 20, 2019, which claims the benefit of Korean Patent Application No. 10-2018-0118469 filed on Oct. 4, 2018 at the Korean Intellectual Property Office, the disclosures of which are incorporated by reference herein in their entirety.

BACKGROUND

1. Field

The present invention relates to a touch sensor-antenna module and a display device including the same. More particularly, the present invention related to a touch sensor-antenna module including an antenna pattern and a touch sensor layer, and a display device including the same.

2. Description of the Related Art

As information technologies have been developed, a wireless communication technology such as Wi-Fi, Bluetooth, etc., is combined with a display device in, e.g., a smartphone. In this case, an antenna may be combined with the display device to provide a communication function.

Mobile communication technologies have been rapidly developed, an antenna capable of operating an ultra-high frequency communication, e.g., 3G to 5G communications is needed in the display device.

Further, a touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device. For example, as disclosed in Korean Published Patent Application No. 2014-0092366, various image display devices combined with a touch screen panel including a touch sensor has been developed recently.

When the antenna and the touch sensor are present in one display device, desired gain property of the antenna may not be obtained due to a mutual signal interference and an impedance property for receiving a desired frequency may be disturbed.

SUMMARY

According to an aspect of the present invention, there is provided a touch sensor-antenna module having improved signaling efficiency and reliability.

According to an aspect of the present invention, there is provided a display device including a touch sensor-antenna module with improved signaling efficiency and reliability.

The above aspects of the present invention will be achieved by the following features or constructions:

(1) A touch sensor-antenna module, comprising: a touch sensor electrode layer including a plurality of sensing electrodes and traces electrically connected to the sensing electrodes; and an antenna electrode layer disposed over the touch sensor electrode layer or under the touch sensor electrode layer, the antenna electrode layer including an antenna pattern that does not overlap the traces in a planar view.

(2) The touch sensor-antenna module according to the above (1), wherein a plurality of the antenna patterns are arranged to be spaced apart from the traces in the planar view.

(3) The touch sensor-antenna module according to the above (2), wherein the antenna patterns do not overlap the sensing electrodes in the planar view.

(4) The touch sensor-antenna module according to the above (3), wherein the antenna patterns are disposed between the sensing electrodes in the planar view.

(5) The touch sensor-antenna module according to the above (1), wherein the antenna electrode layer further includes a dummy antenna pattern formed at the same level with the antenna pattern.

(6) The touch sensor-antenna module according to the above (5), further comprising an antenna driving integrated circuit chip that is connected to the antenna pattern and is not connected to the dummy antenna pattern.

(7) The touch sensor-antenna module according to the above (1), wherein the antenna electrode layer further includes a dummy pattern around the antenna pattern, and the antenna pattern and the dummy pattern include a mesh structure.

(8) The touch sensor-antenna module according to the above (7), wherein the sensing electrodes are entirely covered by the dummy pattern in the planar view.

(9) The touch sensor-antenna module according to the above (1), wherein the antenna pattern includes a radiation electrode, a pad and a transmission line that electrically connects the radiation electrode and the pad.

(10) The touch sensor-antenna module according to the above (9), wherein the pad includes a signal pad and a ground pad that is spaced apart from the signal pad and electrically separated from the transmission line.

(11) The touch sensor-antenna module according to the above (10), wherein a pair of the ground pads are disposed to face each other with respect to the signal pad.

(12) The touch sensor-antenna module according to the above (1), further comprising a dielectric layer on which the antenna electrode layer is disposed.

(13) The touch sensor-antenna module according to the above (1), wherein the sensing electrodes include first sensing electrodes defining a plurality of first sensing electrode rows, and second sensing electrodes defining a plurality of second sensing electrode columns.

(14) The touch sensor-antenna module according to the above (13), wherein the traces include first traces each extending from the first sensing electrode row, and second traces each extending from the second sensing electrode column, wherein the first traces are dispersed at both lateral portions of the touch sensor-antenna module.

(15) A display device including the touch sensor-antenna module according to any one of the above (1) to (14).

According to exemplary embodiments of the present invention, a touch sensor-antenna module may include a plurality of antenna patterns as an array so that radiation directivity and antenna gain may be improved.

The antenna patterns may be disposed over or under a touch sensor such that a transmission line included in the antenna pattern may not overlap a trace included in the touch sensor. Thus, signal disturbance and impedance mismatching by the trace of the touch sensor may be prevented and radiation reliability of the antenna patterns may be improved.

In some embodiments, a feeding may be selectively performed to only an antenna pattern that may not overlap the trace of the plurality of the antenna patterns via an integrated circuit (IC) chip so that signaling/radiation reliability may be enhanced.

DETAILED DESCRIPTION OF THE EMBODIMENTS

According to exemplary embodiments of the present invention, a touch sensor-antenna module that includes a touch sensor electrode layer including a plurality of sensing electrodes and traces electrically connected to the sensing electrodes, and an antenna electrode layer including an antenna pattern is provided. Further, a display device having improved signaling reliability and efficiency from the touch sensor-antenna module is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
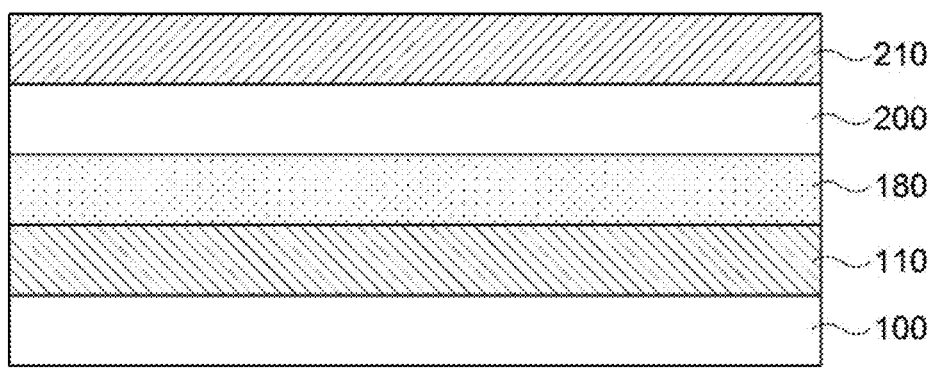
FIGS. 1 and 2 are cross-sectional views illustrating touch sensor-antenna modules in accordance with exemplary embodiments.
Figure 2:
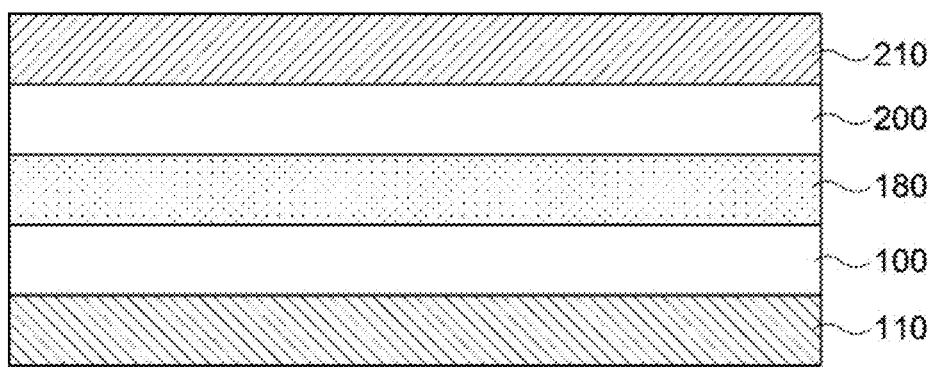

FIGS. 1 and 2 are cross-sectional views illustrating touch sensor-antenna modules in accordance with exemplary embodiments.

Referring to FIG. 1, the touch sensor-antenna module may include an antenna electrode layer 110 and a touch sensor electrode layer 210.

The antenna electrode layer 110 may be disposed on a dielectric layer 100. The dielectric layer 100 may include, e.g., a transparent resin material. For example, the dielectric layer 100 may include a thermoplastic resin, e.g., a polyester-based resin such as polyethylene terephthalate, polyethylene isophthalate, polyethylene naphthalate, polybutylene terephthalate, etc.; a cellulose-based resin such as diacetyl cellulose, triacetyl cellulose, etc.; a polycarbonate-based resin; an acryl-based resin such as polymethyl (meth)acrylate, polyethyl (meth)acrylate, etc.; a styrene-based resin such as polystyrene, an acrylonitrile-styrene copolymer; a polyolefin-based resin such as polyethylene, polypropylene, a polyolefin having a cyclo or norbornene structure, etc.; a vinyl chloride-based resin; an amide-based resin such as nylon, an aromatic polyamide, etc.; an imide-based resin; a polyether sulfone-based resin; a sulfone-based resins; a polyether ether ketone-based resin; a polyphenylene sulfide-based resin; a vinyl alcohol-based resin; a vinylidene chloride-based resin; a vinyl butyral-based resin; an allylate-based resin; a polyoxymethylene-based resin; an epoxy-based resin, or the like. These may be used alone or in a combination thereof.

A transparent film formed of a thermosetting resin or an ultraviolet curable resin such as a (meth)acryl-based resin, an urethane-based resin, an acryl urethane-based resin, an epoxy-based resin, a silicone-based resin, etc., may be also used as the dielectric layer 100. In some embodiments, the dielectric layer 100 may include an inorganic material such as silicon oxide, silicon nitride, silicon oxynitride, glass, etc.

The dielectric layer 100 may be a substantially single layer or may have a multi-layered structure including at least two layers.

A capacitance or an inductance may be created in the dielectric layer 100 so that a frequency range in which the antenna pattern included in the antenna electrode layer 110 is operated may be controlled. In some embodiments, a dielectric constant of the dielectric layer 100 may be in a range from about 1.5 to about 12. If the dielectric constant exceeds about 12, a driving frequency may be excessively decreased and a desired high-frequency radiation may not be implemented. Preferably, the dielectric constant of the dielectric layer 100 may be in a range from about 2 to 12.

The antenna electrode layer 110 may be formed on, e.g., an upper surface of the dielectric layer 100. Elements and structure of the antenna electrode layer 110 may be described in more detail with reference to FIG. 3.

An antenna device (e.g., a film antenna or an antenna layer) may be defined by, e.g., the antenna electrode layer 110 and the dielectric layer 100. The antenna device may be a microstrip patch antenna fabricated as a transparent film. The antenna device may be applied to a communication device or a display device for high frequency or ultra-high frequency (for example, 3G, 4G, 5G or more) mobile communications.

In some embodiments, a ground layer (not illustrated) may be disposed on a lower surface of the dielectric layer 100. In an embodiment, a conductive member of the display device to which the antenna device may be applied may serve as the ground layer. The conductive member may include a gate electrode of a thin film transistor (TFT), various wirings such as a scan line or a data line, various electrodes such as a pixel electrode, a common electrode, etc., included in the display device.

In an embodiment, a distance between the antenna electrode layer 110 and the ground layer (e.g., a thickness of the dielectric layer 100) may be in a range from about 40 μm to about 1,000 μm. In this case, e.g., the 5G high frequency communication may be easily implemented.

The touch sensor electrode layer 210 may be disposed on a substrate layer 200. The substrate layer 200 may include a support layer for forming electrodes of the touch sensor electrode layer 210 or a film-type member for protecting the electrodes. For example, a film material commonly used in a touch sensor may be used as the substrate layer 200.

For example, the substrate layer 200 may include a resin material, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc.

A touch sensor may be defined by the touch sensor electrode layer 210 and the substrate layer 200. In some embodiments, a passivation layer or an encapsulation layer may be further formed on the substrate layer 200 to cover the touch sensor electrode layer 210. Elements and structures of the touch sensor electrode layer 210 are described in more detail with reference to FIG. 5.

The antenna device and the touch sensor may be combined with each other by, e.g., an adhesive layer 180 to obtain the touch sensor-antenna module according to exemplary embodiments. The adhesive layer 180 may be formed of a pressure sensitive adhesive (PSA) layer or an optically clear adhesive (OCA) including, e.g., an acryl-based resin, a urethane-based resin, a silicone-based resin, etc.

As illustrated in FIG. 1, the antenna electrode layer 110 of the antenna device may be attached to the substrate layer 200 of the touch sensor layer via the adhesive layer 180. In some embodiments, the antenna electrode layer 110 may be disposed under the touch sensor electrode layer 210 based on a viewer's side.

Referring to FIG. 2, the dielectric layer 100 of the antenna device may be attached to the substrate layer 200 of the touch sensor layer via the adhesive layer 180. In some embodiments, the antenna electrode layer 110 may be placed toward the viewer's side, and the touch sensor electrode layer 210 may be disposed under the antenna electrode layer 110 based on the viewer's side.

Figure 3:
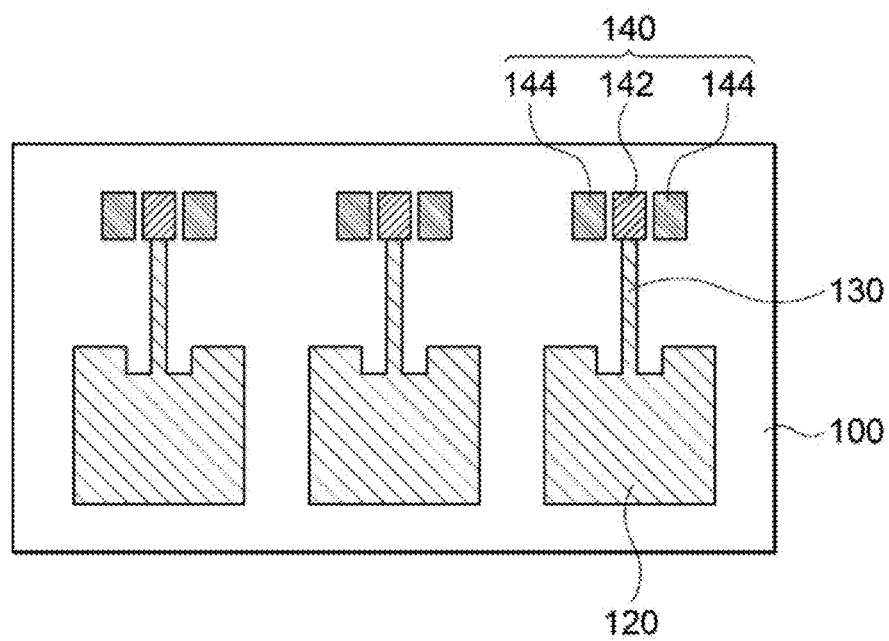
FIG. 3 is a schematic top planar view illustrating an antenna electrode layer in a touch sensor-antenna module in accordance with exemplary embodiments.

FIG. 3 is a schematic top planar view illustrating an antenna electrode layer in a touch sensor-antenna module in accordance with exemplary embodiments.

Referring to FIG. 3, a plurality of antenna patterns may be arranged on the dielectric layer 100. Each antenna pattern may include a radiation electrode 120, a transmission line 130 and a pad 140. The pad 140 may include a signal pad 142 and a ground pad 144.

The radiation pad 120 may have, e.g., a polygonal plate shape, and the transmission line 130 may extend from a central portion of one side of the radiation electrode 120 to be electrically connected to the signal pad 142. The transmission line 130 may be formed as a unitary member substantially integral with the radiation electrode 120.

In some embodiments, a pair of the ground pads 144 may be disposed with respect to the signal pad 142. The ground pads 144 may be electrically separated from the signal pad 142 and the transmission line 130.

The radiation electrode 120, the transmission line 130 and/or the pad 140 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof. These may be used alone or in a combination thereof.

In an embodiment, the radiation electrode 120 may include silver (Ag) or a silver alloy such as a silver-palladium-copper (APC) alloy. In an embodiment, the radiation electrode 120 may include copper (Cu) or a copper alloy in consideration of low resistance and pattern formation with a fine line width. For example, the radiation electrode 120 may include a copper-calcium (Cu—Ca) alloy.

In some embodiments, the radiation electrode 120 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the radiation electrode 120 may include a multi-layered structure including the transparent conductive oxide and the metal. For example, the radiation electrode 120 may have a triple-layered structure of a transparent conductive oxide layer-a metal layer-a transparent conductive oxide layer. In this case, a flexible property may be enhanced by the metal layer so that a resistance may be reduced and a signal transfer speed may be improved. Further, a resistance to corrosion and a transparency may be enhanced by the transparent conductive oxide layer.

Figure 4:
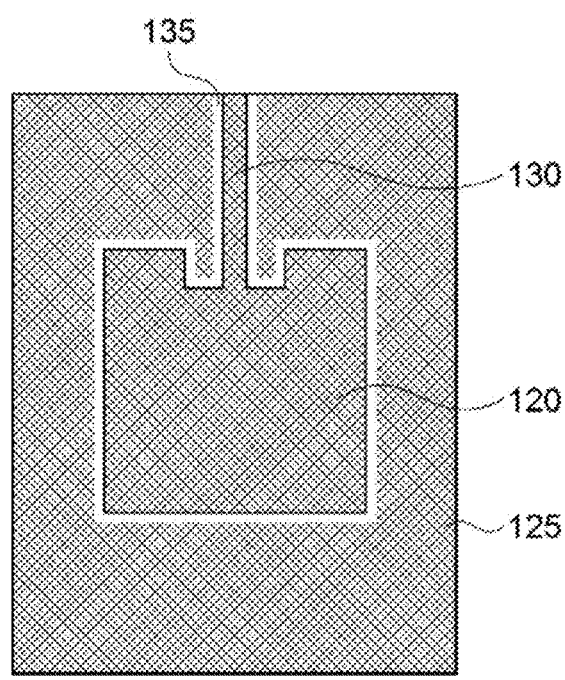
FIG. 4 is a schematic top planar view illustrating an antenna electrode layer in a touch sensor-antenna module in accordance with some exemplary embodiments.

FIG. 4 is a schematic top planar view illustrating an antenna electrode layer in a touch sensor-antenna module in accordance with some exemplary embodiments.

Referring to FIG. 4, a dummy pattern 125 having a mesh structure may be disposed around the radiation electrode 120. In an embodiment, the radiation electrode 120 may include a mesh structure substantially the same as or similar to that of the dummy pattern 125.

For example, the radiation electrode 120 and the dummy pattern 125 may be separated and insulated from each other by a separation region 135 formed along a periphery of the radiation electrode 120.

The radiation electrode 120 and the dummy pattern 125 may be formed of the substantially the same or similar mesh structure so that a transmittance of the antenna device may be improved and visibility of the radiation electrode 120 caused by a pattern structure deviation may be reduced or prevented.

In some embodiments, the transmission line 130 diverged from the radiation electrode 120 may also include a mesh structure. In an embodiment, the pad 140 may have a solid pattern structure for improving a signal transfer speed and reducing a resistance.

Figure 5:
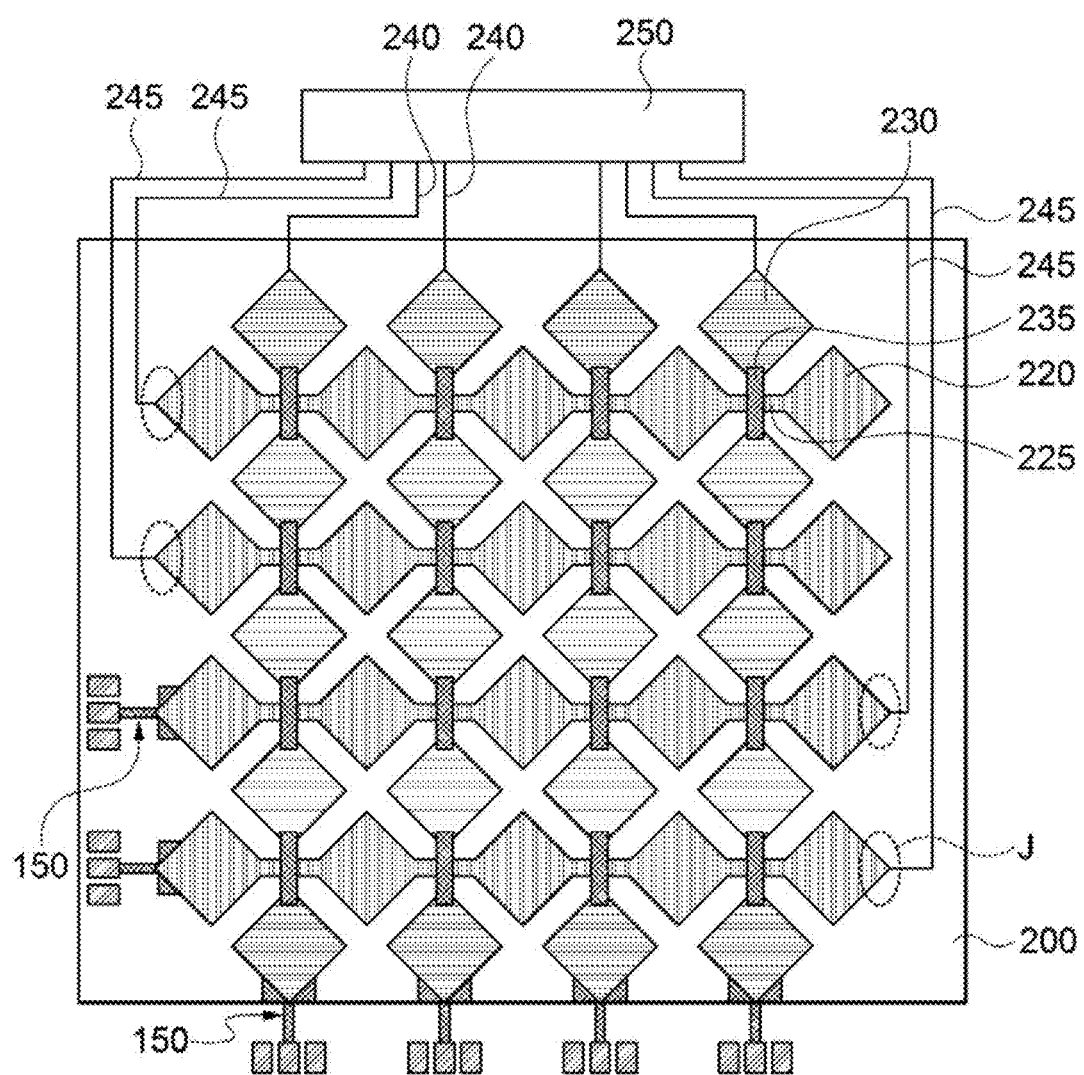
FIG. 5 is a schematic top planar view illustrating a touch sensor-antenna module in accordance with exemplary embodiments.

FIG. 5 is a schematic top planar view illustrating a touch sensor-antenna module in accordance with exemplary embodiments.

Referring to FIG. 5, the touch sensor-antenna module (hereinafter, abbreviated as a module) may include the touch sensor electrode layer 210 (see FIG. 1 or FIG. 2) on the substrate layer 200 and antenna patterns 150.

The touch sensor electrode layer 210 may include sensing electrodes 220 and 230, and traces 240 and 245. The sensing electrodes 220 and 230 may include first sensing electrodes 220 and second sensing electrodes 230. The traces 240 and 245 may include first traces 245 and second traces 240.

The first sensing electrodes 220 may be arranged along, e.g., a row direction parallel to an upper surface of the substrate layer 200 (e.g., an X-direction). Accordingly, a first sensing electrode row extending in the row direction may be formed by the first sensing electrodes. A plurality of the first sensing electrode rows may be arranged along a column direction (e.g., a Y-direction).

In some embodiments, the first sensing electrodes 220 neighboring in the row direction may be physically or electrically connected to each other by a connecting portion 225. For example, the connecting portion 225 may be formed as a substantially integral or unitary member with the first sensing electrodes 220 at the same level.

The second sensing electrodes 230 may be arranged along the column direction parallel to the upper surface of the substrate layer 200. In some embodiments, the second sensing electrodes 230 may include island-type unit electrodes physically spaced apart from each other. In this case, the second sensing electrodes 230 neighboring in the column direction may be electrically connected to each other by a bridge electrode 235.

Accordingly, a second sensing electrode column extending in the column direction may be formed by the second sensing electrodes 230. A plurality of the second sensing electrode columns may be arranged along the row direction.

For example, an insulation pattern (not illustrated) at least partially covering the connecting portion 225 may be formed, and the bridge electrode 235 may be formed on the insulation pattern to be in contact with or electrically connected to the second sensing electrodes 230 neighboring in the column direction.

Each sensing electrode 220 and 230 may have a rhombus shape as illustrated in FIG. 5. However, the shape of the sensing electrodes 220 and 230 may be properly modified in consideration of an electrode density, a circuit design, a sensitivity, etc.

For example, the sensing electrodes 220 and 230 and/or the bridge electrode 235 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca) or an alloy thereof (e.g., silver-palladium-copper (APC), copper-calcium (Cu—Ca)). These may be used alone or in a combination thereof.

The sensing electrodes 220 and 230 and/or the bridge electrode 235 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 220 and 230 and/or the bridge electrode 235 may include a multi-layered structure including the transparent conductive oxide and the metal. For example, the sensing electrodes 220 and 230 and/or the bridge electrode 235 may have a triple-layered structure of a transparent conductive oxide layer-a metal layer-a transparent conductive oxide layer. In this case, a flexible property may be enhanced by the metal layer so that a resistance may be reduced and a signal transfer speed may be improved. Further, a resistance to corrosion and a transparency may be enhanced by the transparent conductive oxide layer.

The first trace 245 may extend from each first sensing electrode row. For example, the first traces 245 may be dispersed at both later portions in the row direction of the substrate layer 200. The second trace 240 may extend from each second sensing electrode column.

The first and second traces 240 and 245 may be collected in, e.g., a pad region of the touch sensor layer to be electrically connected to a touch sensing integrated circuit (IC) chip 250. A physical signal detected by the sensing electrodes 220 and 230 may be converted into an electrical signal by the touch sensing IC chip 250 so that a touch sensing may be implemented.

The antenna pattern 150 may include the radiation electrode 120, the transmission line 130 and the pad 140 as illustrated in FIG. 3. A plurality of the antenna patterns 150 may be disposed over the touch sensor electrode layer 210 or under the touch sensor electrode layer 210. For convenience of descriptions, the antenna pattern and elements of the touch sensor electrode layer 210 are commonly illustrated in FIG. 5 such that the antenna pattern 150 is illustrated as being disposed under the touch sensor electrode layer 210.

In exemplary embodiments, the antenna patterns 150 may not overlap the traces 240 and 245 of the touch sensor electrode layer 210 when projected in a planar view. For example, the antenna patterns 150 may be offset or staggered from the traces 240 and 245 in the planar view.

The traces 240 and 245 through which a touch sensing signal may be transferred may not overlap the transmission line of the antenna pattern 150 so that a signal loss from the transmission line may be reduced to improve radiation efficiency and gain property of the antenna pattern 150. Further, a preset impedance value of the antenna pattern 150 may not be disturbed by an electrical signal of the touch sensor electrode layer 210 to prevent an impedance mismatching.

In exemplary embodiments, the antenna pattern 150 may be aligned to avoid a junction region J (designated by a dotted circle) of the trace 245 and the sensing electrode 220 so that radiation and signal interruption of the antenna pattern 150 at the junction region J to which a current flow may be concentrated may be prevented.

A plurality of the antenna patterns 150 may be provided as an array shape so that directivity and radiation intensity from the antenna electrode layer 110 may be enhanced. As illustrated in FIG. 5, the antenna patterns 150 may be selectively arranged along the row direction and the column direction at a peripheral region of the module at which the traces 240 and 245 may not be arranged.

As described above, the dummy pattern 125 (see FIG. 4) having the mesh structure may be formed around the radiation electrode 120 of the antenna pattern 150. In some embodiments, the dummy pattern 125 may substantially entirely overlap the sensing electrodes 220 and 230 of the touch sensor electrode layer 210 in the planar view.

The dummy pattern 125 may be disposed around the radiation electrode 120 so that the radiation electrode 120 of the antenna pattern 150 may be prevented from being viewed by a user. The dummy pattern 125 may uniformly overlap the sensing electrodes 220 and 230 so that uniformity of capacitance created between the sensing electrodes 220 and 230 may be enhanced.

Figure 6:
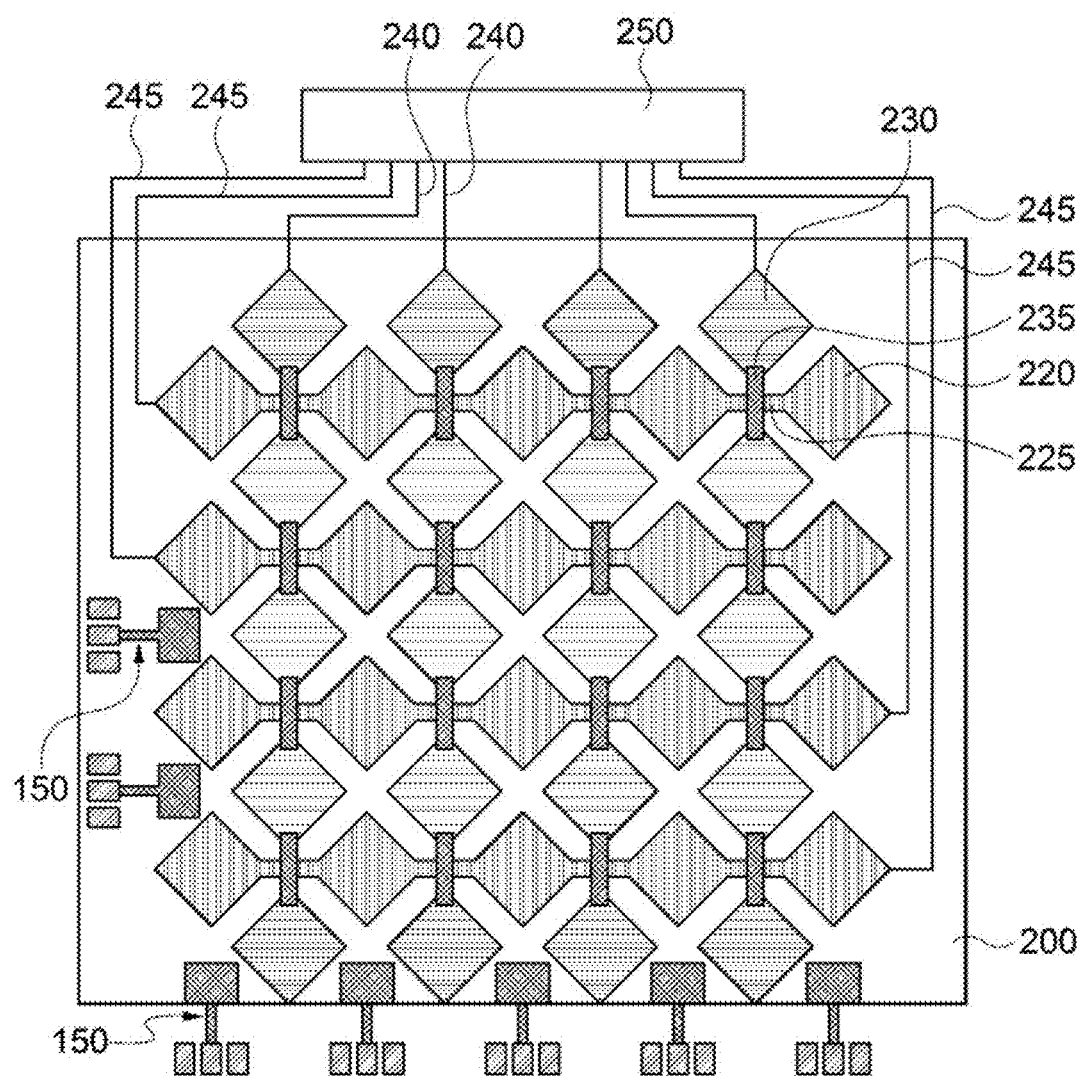
FIG. 6 is a schematic top planar view illustrating a touch sensor-antenna module in accordance with some exemplary embodiments.
Figure 7:
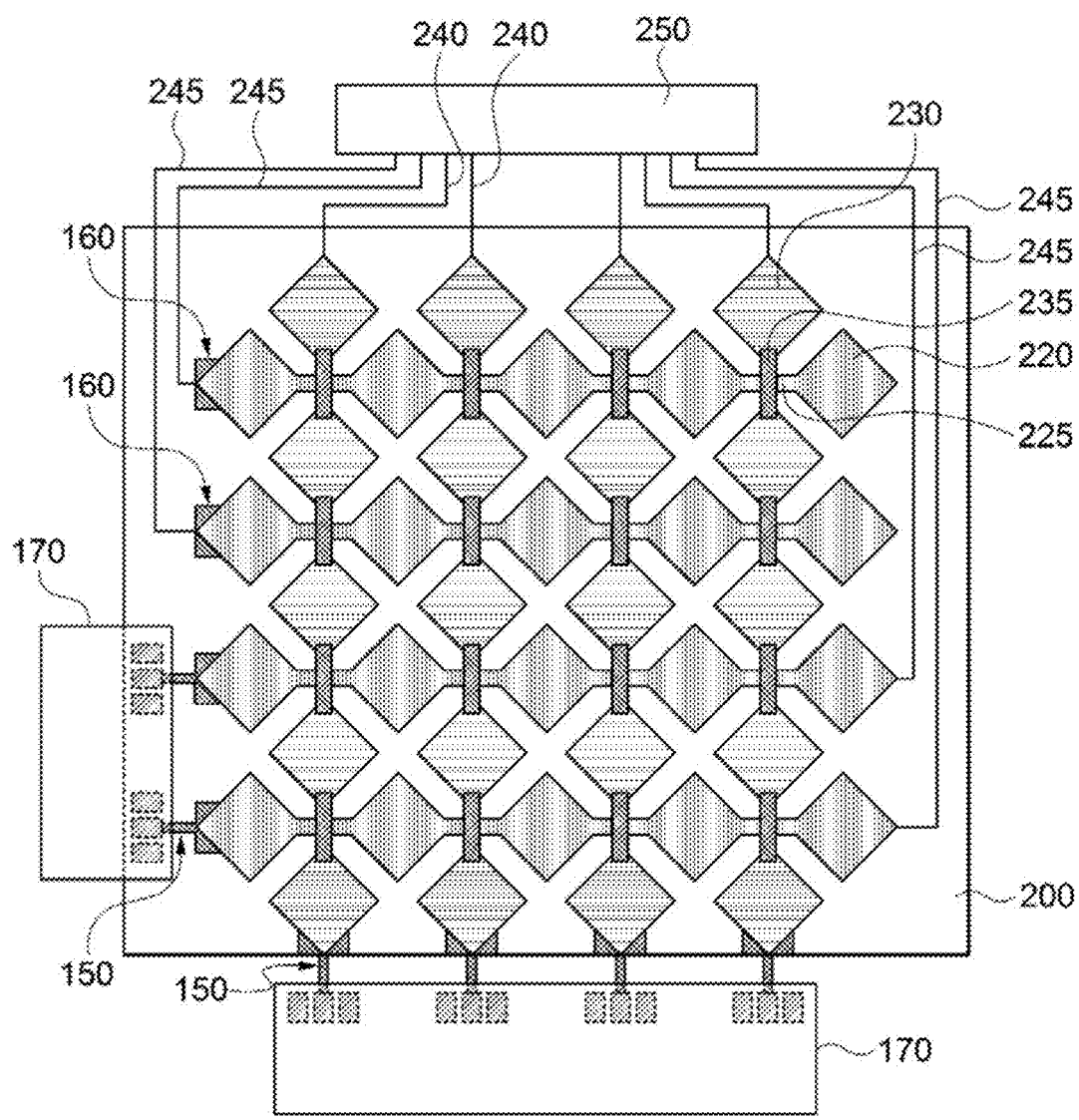
FIG. 7 is a schematic top planar view illustrating a touch sensor-antenna module in accordance with some exemplary embodiments.

FIGS. 6 and 7 are schematic top planar views illustrating touch sensor-antenna modules in accordance with some exemplary embodiments. Detailed descriptions on elements and structures substantially the same as or similar to those illustrated in FIG. 5 are omitted herein.

Referring to FIG. 6, the antenna patterns 150 may not overlap the traces 240 and 245, and also not overlap the sensing electrodes 220 and 230. Accordingly, a capacitance between the sensing electrodes 220 and 230 may be prevented from being disturbed by the radiation electrode 120 of the antenna pattern 150.

In some embodiments, as illustrated in FIG. 6, the antenna patterns 150 (or the radiation electrodes) may be arranged along a peripheral portion of the module to be far from traces 240 and 245 and may be interposed between the neighboring sensing electrodes 220 and 230.

Referring to FIG. 7, the antenna electrode layer 110 may further include a dummy antenna pattern 160 together with the antenna patterns 150. In exemplary embodiments, the antenna patterns 150 may be electrically connected to an antenna driving IC chip 170 so that a feeding and a signal transfer may be implemented. For example, the antenna patterns 150 may be connected to the antenna driving IC chip 170 via a flexible printed circuit board (FPCB). In some embodiments, the antenna driving IC chip 170 may be mounted directly on the flexible printed circuit board (FPCB).

As described above, the antenna patterns 150 may be arranged to avoid the overlap with traces 240 and 245 of the touch sensor electrode layer 210.

The dummy antenna pattern 160 may not be connected to the antenna driving IC chip 170, and thus a radiation operation may not be substantially implemented from the dummy antenna pattern 160. In an embodiment, as illustrated in FIG. 7, the dummy antenna pattern 160 may have a shape substantially the same or similar to that of the radiation electrode included in the antenna pattern 150. For example, the transmission line and the pad of the antenna pattern 150 may be omitted from the dummy antenna pattern 160.

The dummy antenna pattern 160 may be arranged together with the antenna patterns 150 so that a uniformity of an entire pattern arrangement in the antenna electrode layer 110 may be enhanced. Accordingly, a uniformity of the capacitance created by the sensing electrodes 220 and 230 may be also enhanced.

Figure 8:
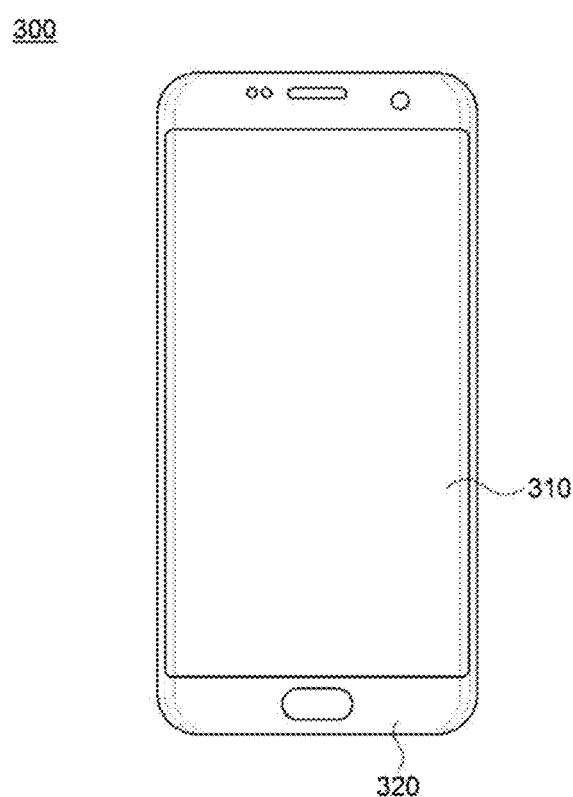
FIG. 8 is a schematic top planar view illustrating a display device in accordance with exemplary embodiments.

FIG. 8 is a schematic top planar view illustrating a display device in accordance with exemplary embodiments. For example, FIG. 8 illustrates an outer shape including a window of a display device.

Referring to FIG. 8, a display device 300 may include a display region 310 and a peripheral region 320. The peripheral region 320 may correspond to both end portions and/or both lateral portions around the display region 310. The peripheral region 320 may correspond to a light-shielding portion or a bezel portion.

In some embodiments, the touch sensor-antenna module may be disposed throughout the display region 310 and the peripheral region 320, and the sensing electrodes 220 and 230 of the touch sensor electrode layer 210 may be arranged in the display region 310.

As illustrated in FIGS. 5 to 7, the antenna patterns 150 may be arranged along a peripheral region of the module, and may be disposed in the peripheral region 320. For example, the pad 140 of the antenna pattern 150 and the traces 240 and 245 of the touch sensor electrode layer 210 may be disposed in the peripheral region 320.

Further, the driving IC chips 170 and 250 may be also disposed in the peripheral region 320. The pads 140 of the antenna pattern may be adjacent to the antenna driving IC chip 170 in the peripheral region 320 so that a length of a signal transfer path may be decreased and a signal loss may be suppressed.

In some embodiments, at least a portion of the radiation electrode 120 included in the antenna pattern 150 may be disposed in the display region 310. For example, as illustrated in FIG. 4, the radiation electrode 120 may include the mesh structure so that visibility of the radiation electrode 120 may be reduced.

Figure 9:
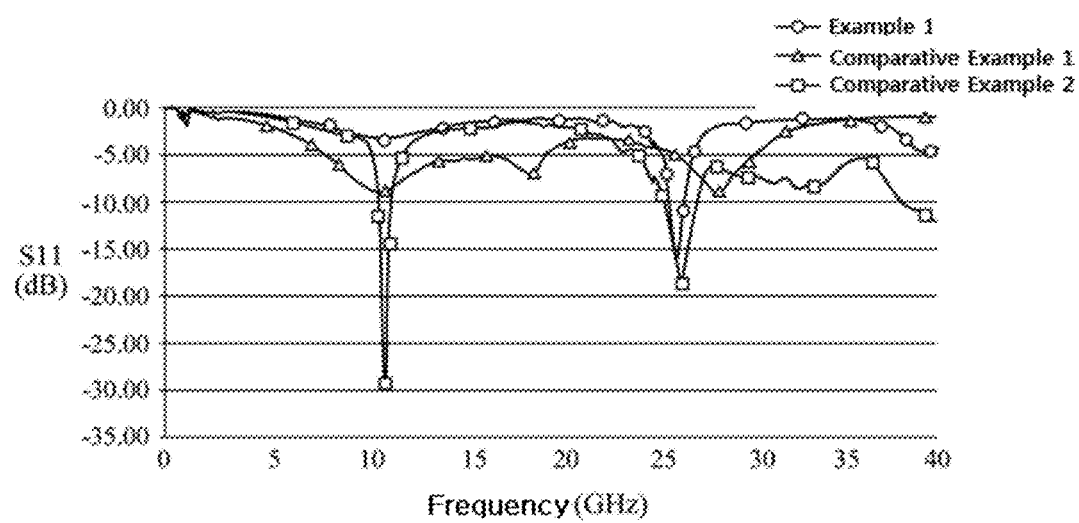
FIG. 9 is a graph showing return loss evaluation results of touch sensor-antenna modules according to Example and Comparative Example.

FIG. 9 is a graph showing return loss evaluation results of touch sensor-antenna modules according to Example and Comparative Example.

Specifically, FIG. 9 is a graph showing return loss (S11) values measured by Network analyzer when feeding was performed to a touch sensor-antenna module sample in which the antenna patterns were arranged to avoid the traces of the touch sensor as illustrated in FIG. 5 (Example 1), a touch sensor-antenna module sample in which the traces of the touch sensor were disposed under the antenna patterns to overlap the antenna patterns (Comparative Example 1) and a touch sensor-antenna module sample in which the traces of the touch sensor were disposed over the antenna patterns to overlap the antenna patterns (Comparative Example 2).

Referring to FIG. 9, in Comparative Example 1, the trace was under the antenna pattern to overlap the antenna pattern, and a frequency peak was shifted by an impedance mismatching to cause a signal or power loss.

In Comparative Example 2, the trace was disposed over the antenna pattern to overlap the antenna pattern, and a signal shielding was caused to further increase the signal or power loss.

What is claimed is:

1. A touch sensor-antenna module, comprising:
   a touch sensor layer having a pad region, the touch sensor layer comprising:
   a substrate layer; and
   a touch sensor electrode layer on the substrate layer, the touch sensor electrode layer comprising sensing electrodes and traces electrically connected to the sensing electrodes, wherein end portions of the traces are assembled in the pad region; and
   an antenna electrode layer disposed over the touch sensor electrode layer or under the touch sensor electrode layer, the antenna electrode layer comprising an antenna pattern that does not overlap the traces to be physically spaced apart from the traces in a planar view, the antenna pattern electrically separated from the sensing electrodes and the traces,
   wherein the antenna pattern is disposed at a different level from that of all of the sensing electrodes;
   the antenna pattern comprises a plurality of antenna patterns, and each of the plurality of antenna patterns comprises a single radiation electrode, a signal pad and a transmission line that electrically connects the radiation electrode and the signal pad, and the signal pad is electrically connected only to the single radiation electrode;
   the plurality of antenna patterns are independently separated from each other, and the plurality of antenna patterns are arranged along a peripheral region of the substrate layer not to overlap the pad region of the touch sensor electrode layer in the planar view and to be electrically and physically separated from the pad region of the touch sensor layer.

2. The touch sensor-antenna module according to claim 1, wherein the antenna patterns do not overlap the sensing electrodes in the planar view.

3. The touch sensor-antenna module according to claim 2, wherein the antenna patterns are disposed between the sensing electrodes in the planar view.

4. The touch sensor-antenna module according to claim 1, wherein the antenna electrode layer further comprises a dummy antenna pattern formed at the same level with the antenna pattern.

5. The touch sensor-antenna module according to claim 4, further comprising an antenna driving integrated circuit chip that is connected to the antenna pattern and is not connected to the dummy antenna pattern.

6. The touch sensor-antenna module according to claim 1, wherein the antenna electrode layer further comprises a dummy pattern around the antenna pattern, and the antenna pattern and the dummy pattern include a mesh structure.

7. The touch sensor-antenna module according to claim 6, wherein the sensing electrodes are entirely covered by the dummy pattern in the planar view.

8. The touch sensor-antenna module according to claim 1, wherein the antenna pattern further comprises a ground pad that is spaced apart from the signal pad and electrically separated from the transmission line.

9. The touch sensor-antenna module according to claim 8, wherein the ground pad comprises a pair of ground pads that are disposed to face each other with respect to the signal pad.

10. The touch sensor-antenna module according to claim 1, further comprising a dielectric layer on which the antenna electrode layer is disposed.

11. The touch sensor-antenna module according to claim 1, wherein the sensing electrodes comprise first sensing electrodes defining a plurality of first sensing electrode rows, and second sensing electrodes defining a plurality of second sensing electrode columns.

12. The touch sensor-antenna module according to claim 11, wherein the traces comprise first traces each extending from the first sensing electrode row, and second traces each extending from the second sensing electrode column, and the first traces are dispersed at both lateral portions of the touch sensor-antenna module.

13. A display device comprising the touch sensor-antenna module according to claim 1.

14. The touch sensor-antenna module according to claim 1, wherein the pair of ground pads face each other with the signal pad interposed therebetween to be spaced apart from the signal pad at the same level from that of the single radiation electrode, the signal pad and the transmission line.

\* \* \* \* \*